(12) United States Patent
Palmer

(10) Patent No.: US 8,353,488 B2
(45) Date of Patent: Jan. 15, 2013

(54) BICYCLE PARKING STRUCTURE

(75) Inventor: Geoff Palmer, San Francisco, CA (US)

(73) Assignee: Palmer Group LLC, San Francisco, CA (US)

( * ) Notice: Subject to any disclaimer, the term of this patent is extended or adjusted under 35 U.S.C. 154(b) by 518 days.

(21) Appl. No.: 12/587,091

(22) Filed: Oct. 1, 2009

(65) Prior Publication Data

US 2011/0079564 A1 Apr. 7, 2011

(51) Int. Cl.
*A45D 19/04* (2006.01)

(52) U.S. Cl. .............. 248/127; 52/40; 52/301; 248/552; 248/309.1; 70/233; 211/5; 211/17

(58) Field of Classification Search .......................... None
See application file for complete search history.

(56) References Cited

U.S. PATENT DOCUMENTS

| | | | | |
|---|---|---|---|---|
| 2,464,683 A | * | 3/1949 | Herbold et al. | 70/235 |
| 3,739,609 A | * | 6/1973 | Kaufmann | 70/234 |
| 3,802,232 A | * | 4/1974 | Mattson et al. | 70/234 |
| 3,918,279 A | * | 11/1975 | Williamson | 70/234 |
| 3,934,436 A | * | 1/1976 | Candlin et al. | 70/234 |
| 4,433,786 A | * | 2/1984 | Wahl | 211/5 |
| 5,197,310 A | * | 3/1993 | Pedersen | 70/227 |
| 5,607,173 A | * | 3/1997 | Lai | 280/293 |
| 5,752,639 A | * | 5/1998 | Rice | 224/521 |
| 5,855,129 A | * | 1/1999 | Warren et al. | 70/234 |
| D408,763 S | * | 4/1999 | Graber | D12/115 |
| 6,192,720 B1 | * | 2/2001 | Kan | 70/49 |
| 6,223,907 B1 | * | 5/2001 | Graber | 211/5 |
| 6,539,759 B2 | * | 4/2003 | Pershall | 70/234 |
| 6,751,992 B1 | * | 6/2004 | Esquilin | 70/233 |
| 7,455,277 B2 | * | 11/2008 | Bishop et al. | 248/552 |
| D605,093 S | * | 12/2009 | Lohr et al. | D12/115 |
| D620,845 S | * | 8/2010 | Scholtz et al. | D12/115 |

* cited by examiner

*Primary Examiner* — Terrell McKinnon
*Assistant Examiner* — Monica Millner
(74) *Attorney, Agent, or Firm* — H. Michael Brucker

(57) ABSTRACT

A bicycle parking structure that is adapted to be mounted on and affixed to a vertical post wherein the mechanism for affixing the parking structure to the post includes a security rod that is hidden and inaccessible.

11 Claims, 7 Drawing Sheets

BICYCLE PARKING STRUCTURE

BACKGROUND

Field of Invention

The present invention relates to bicycle parking structures and, more particularly, to a bicycle parking structure that is adapted to be mounted on, affixed to and locked to a vertical post including a locking mechanism that is hidden and inaccessible.

Many municipalities and other parking authorities throughout the country have replaced the traditional parking meter (a meter on a post anchored in the ground for each parking space) with a single ticket-dispensing machine for multiple parking spaces, leaving the meter posts with no apparent use. Thus, meter posts are typically removed at significant cost and disruption. At the same time, the increased use of bicycles as a means of transportation and recreation has increased the need for bicycle parking structures where bicycles can be parked and secured.

The present invention makes use of meter posts (as well as other secured posts) to create secure bicycle parking structures.

BRIEF DESCRIPTION OF THE INVENTION

The present invention is a bicycle parking structure adapted to be mounted on and affixed to a vertical post wherein the post has a transverse bore, a vertical axis, a major diameter and an anchored lower end secured against movement and an exposed upper end. The lower end is typically cemented into the ground or bolted to a metal plate or the like. The term "anchored" as used herein means secured at its base against removal.

A locking mechanism affixes a tubular sleeve member to the post wherein the locking mechanism engages the post through-bore and a sleeve member through-bore and is entirely within the parking structure where it is hidden from view and inaccessible from outside the parking structure.

The parking structure comprises: a tubular sleeve member adapted to be concentrically disposed about the post and have a transverse through-bore with two apertures that are aligned with a post transverse through-bore when the sleeve member is disposed on the post; a first tubular purchase member having two ends affixed to the sleeve member and defining with the sleeve member a first enclosed space wherein one of the affixed ends is located over one end of the sleeve member through-bore apertures, further wherein the first tubular purchase member has an access bore aligned with the sleeve member through-bore and the post through-bore apertures; a cap member having a top cover dimensioned to engage and seat on the sleeve member upper end and a cap lock member that has a lock aperture wherein the lock member extends into or around the post, and the lock aperture aligns with the sleeve member through-bore, the post through-bore and the purchase member access aperture when the top cover engages the sleeve member; and a security rod disposed, by insertion through the purchase member access aperture, in the post through-bore, the sleeve member through-bore, and the cap lock member aperture and wedged securely in place.

The locking mechanism (security rod) affixing the tubular sleeve member to the post engages the post through-bore and the sleeve member through-bore and is entirely within the parking structure where it is hidden from view and inaccessible from outside the parking structure. The sleeve member also protects the post from being severed from its anchor.

DETAILED DESCRIPTION OF THE INVENTION

Figure 1:
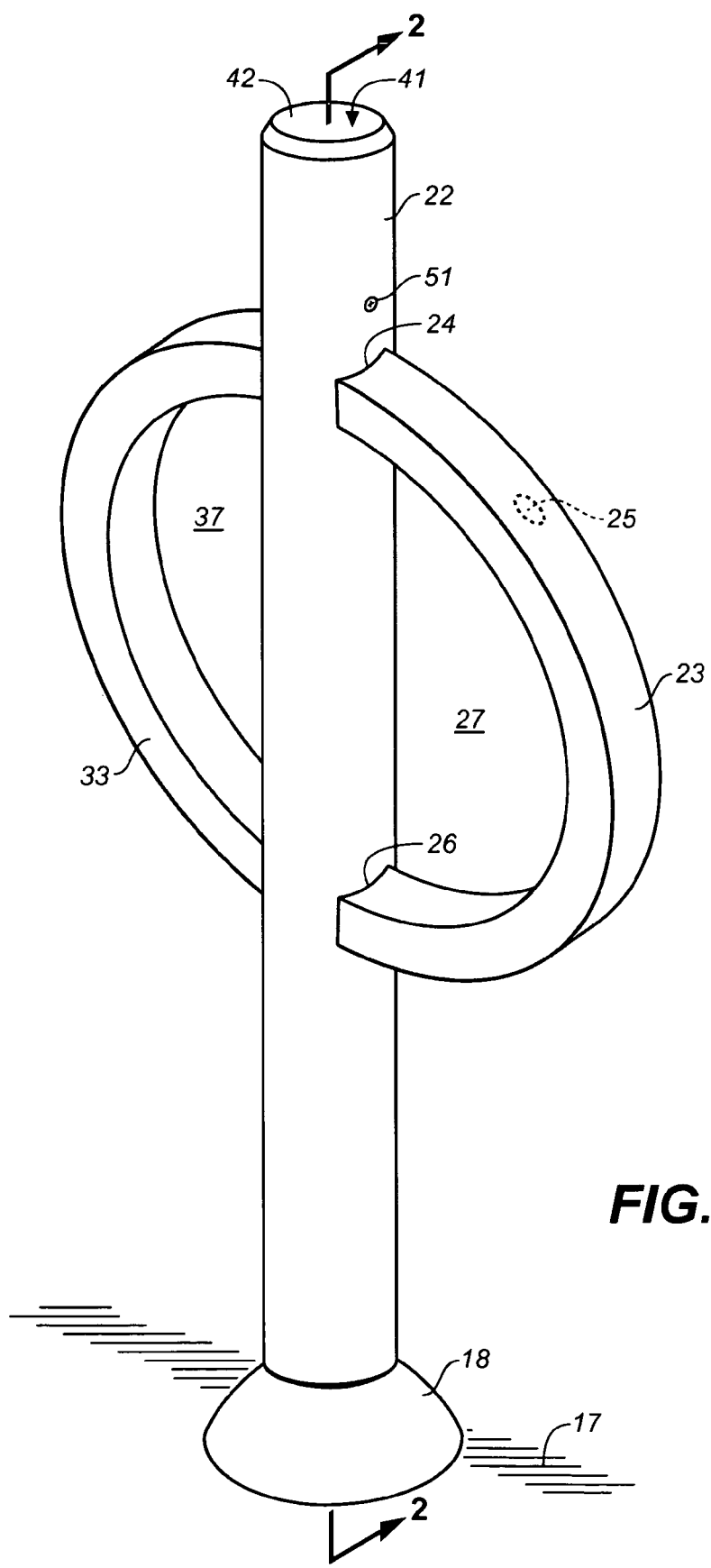
FIG. 1 is a perspective view of one embodiment of the invention.
Figure 1A:
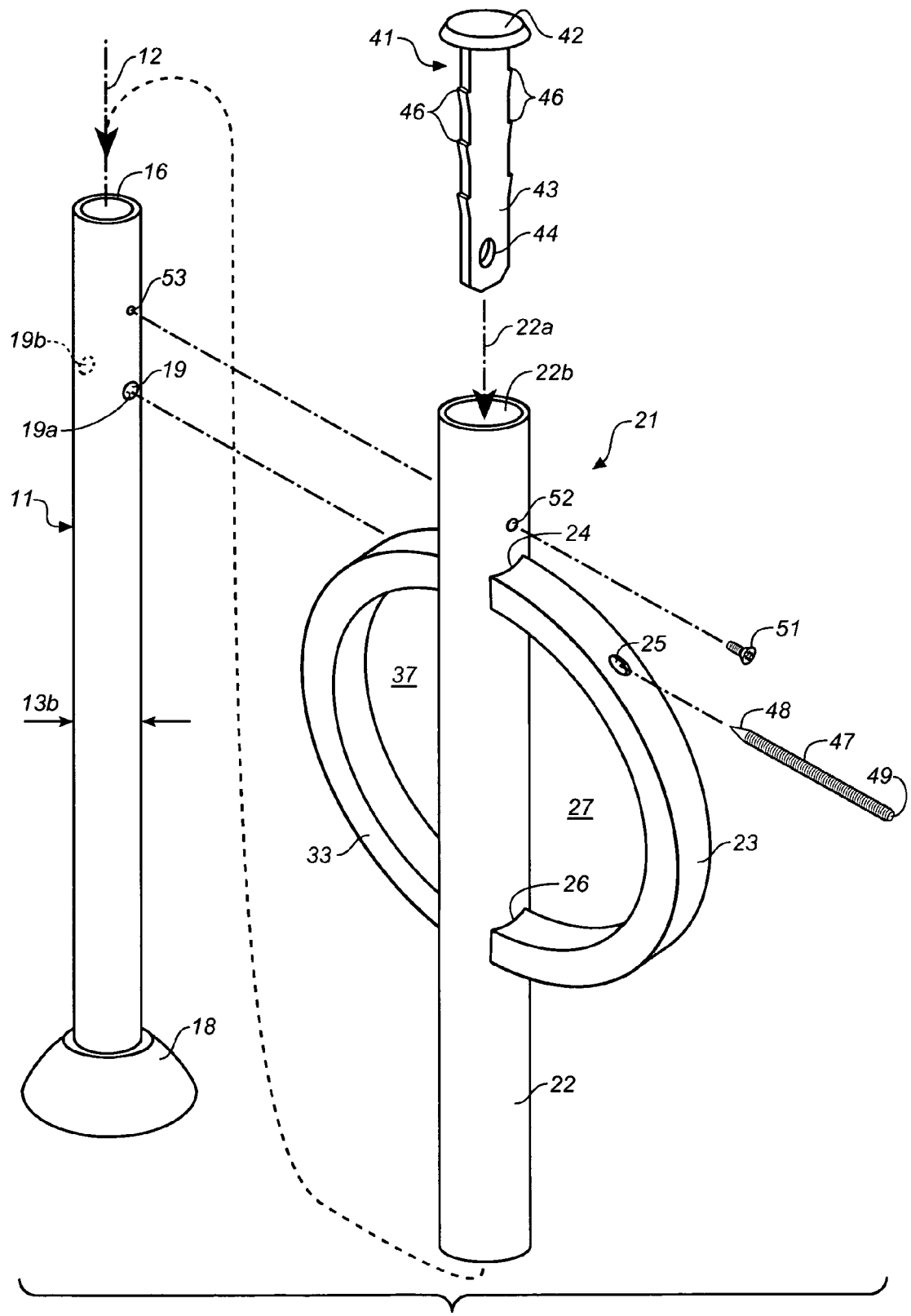
FIG. 1A is an exploded perspective view of the embodiment of FIG. 1.
Figure 2:
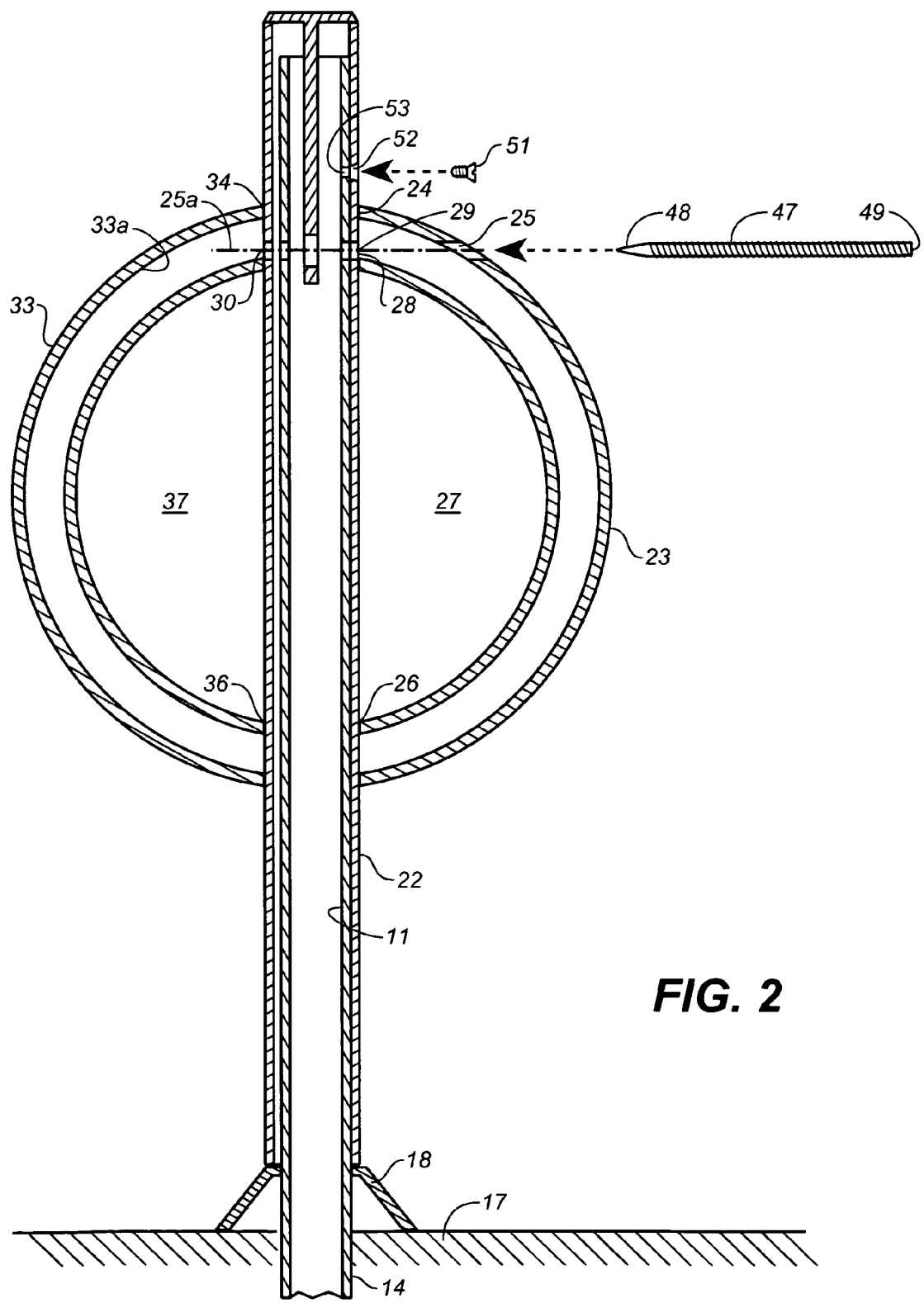
FIG. 2 is a partially exploded sectional view taken along the line 2-2 of FIG. 1.
Figure 2A:
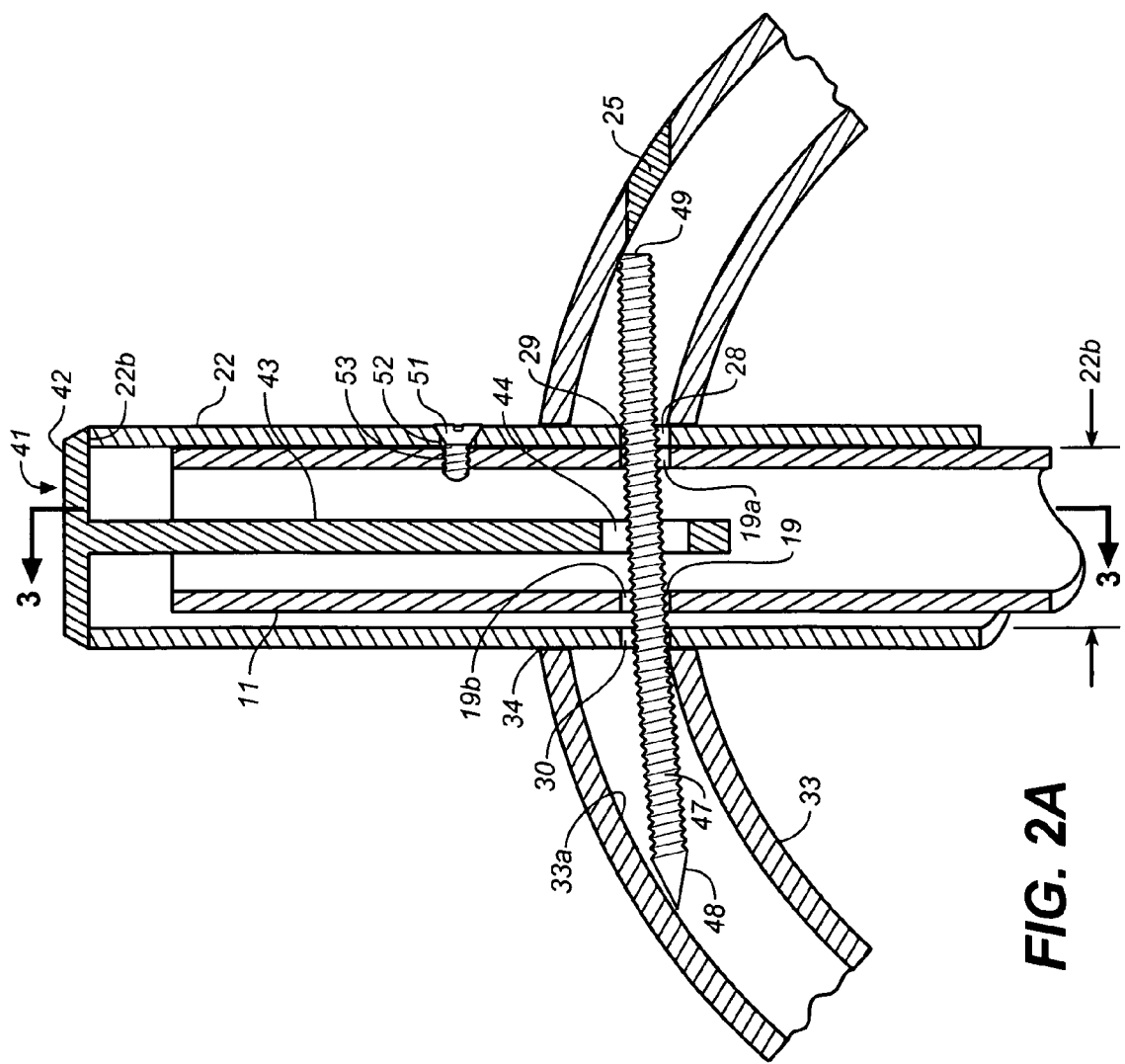
FIG. 2A is an enlarged view of a portion of FIG. 2, unexploded.
Figure 2C:
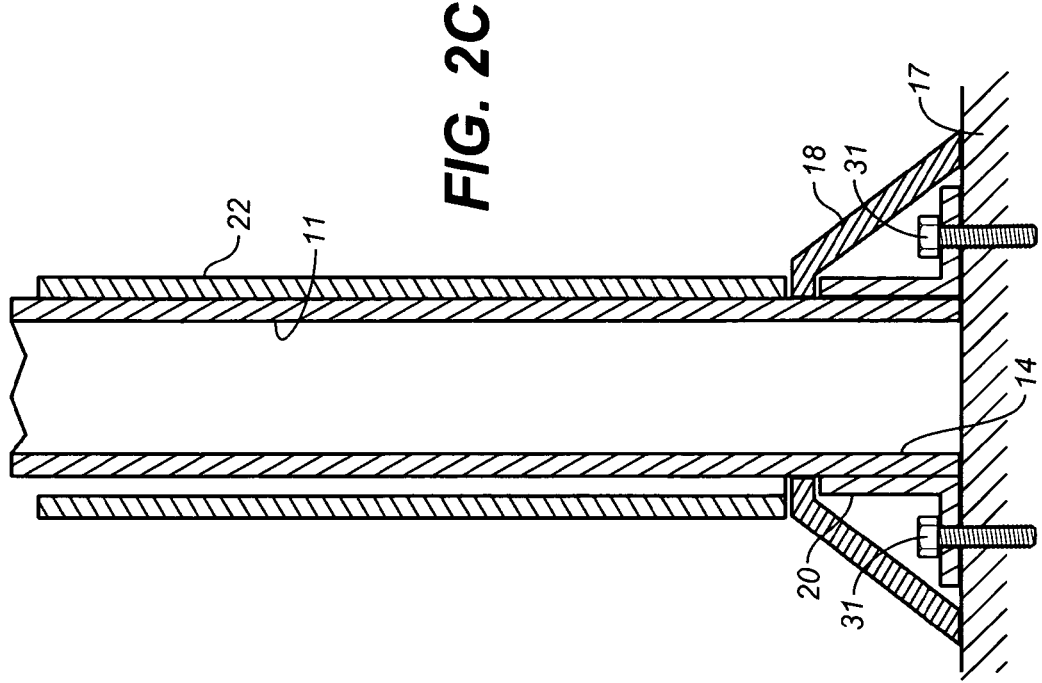
FIG. 2C is a partial sectional view showing an alternative embodiment of the connection between the lower part of the invention and the ground.

Referring to FIGS. 1, 1A, 2, 2A and 3, a generally tubular parking meter post 11 has a vertical axis 12, an inside diameter 13a and an outside diameter 13b, an anchored lower end 14 and an exposed upper end 16. Typically, meter posts such as post 11 are made of hardened steel and cemented into the ground 17 and detailed by a post base cover member 18 that surrounds the lower portion of the post above the ground 17. In some cases, the lower end 14 is not anchored directly in the ground, but rather secured to a platform or other member. As best seen in FIG. 2C, an alternative structure for securing the end 14 is by attaching it (as by welding or the like) to a bracket 20 that is secured to the ground 17 by bolts 20a. The cover 18 surrounds, hides from view, and makes inaccessible the bracket 20, the base of the post 11 and bolts 20a.

The post 11 has a transverse through-bore 19 that, in one preferred embodiment of the invention, penetrates the post to form apertures 19a and 19b at diametrically opposing locations generally transverse to the post vertical axis 12.

Figure 3:
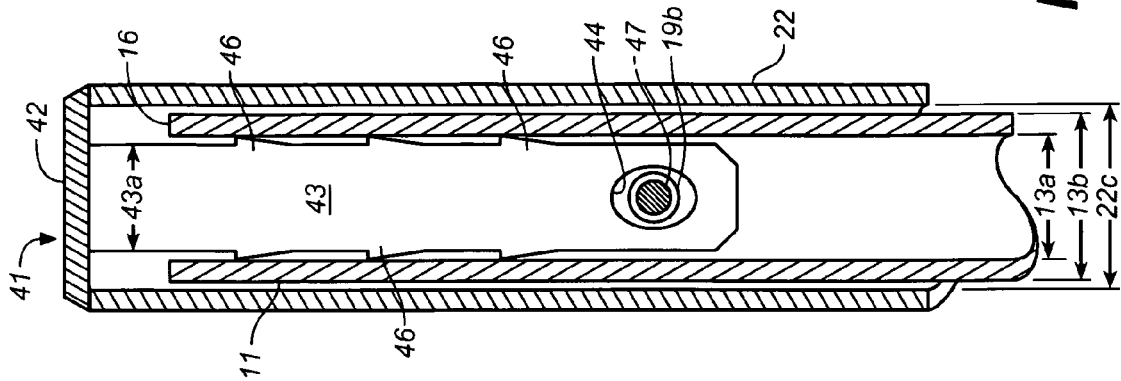
FIG. 3 is a sectional view taken along the line 3-3 of FIG. 2A.

While meter posts are typically right cylinders (constant circular cross-section) that have an inside diameter 13a and outside (major) diameter 13b, as illustrated in FIG. 3, the invention is not so limited. If the post is not a right cylinder (constant diameter) or even tubular, the term "major diameter" as used herein refers to the greatest dimension transverse to the post vertical axis 12 which, in turn, determines the minimum inside diameter of a tubular sleeve into which the post can be inserted (or of a sleeve that can be passed over the post). The inside diameter of the sleeve must be greater than the major diameter of the post as the term "major diameter" is used herein.

The bicycle parking structure 21 comprises a tubular sleeve member 22 adapted to be concentrically disposed about the pot and having a vertical axis 22a, an open upper end 22b, a first tubular purchase member 23 having a first end 24 affixed to sleeve member 22 and a second end 26 affixed to sleeve member 22 and forming an enclosed space 27 therewith. The purchase member 23 is preferably made of metal and affixed to sleeve member 22 by welding or other means by which it is firmly attached and resistant to being dislodged. The purchase member 23 provides a convenient and secure structure to attach a bicycle with a lock, chain or cable.

The sleeve member 22 has an inside diameter 22c that is greater than the major diameter 13b of post 11 whereby sleeve member 22 can be telescoped over (concentrically disposed about) post 11 to surround it.

The sleeve member 22 has a sleeve through-bore 28 that lies on a line generally transverse to the sleeve member axis 22a and pierces the sleeve member to form diametrically opposed apertures 29 and 30. As best seen in FIGS. 2 and 2A, the first end 24 of first purchase member 23 is affixed to sleeve member 22 at the location of aperture 29 which it surrounds. The sleeve through-bore 28 is aligned with post through-bore 19 when sleeve 22 is disposed on post 11. Sleeve member 22 is dimensioned such that when so disposed, the end 22b of sleeve member 22 is above post 11.

The first tubular purchase member 23 has an access aperture 25 located to lie on a line 25a (FIG. 5) which is generally transverse to the sleeve member vertical axis 22a and passes through the sleeve through-bore 28 and post through-bore 19 and resides within the first tubular purchase member between access aperture 25 and aperture 29.

In a preferred embodiment, the parking structure 21 further comprises a second tubular purchase member 33 having a first end 34 affixed to sleeve member 22 and a second end 36 affixed to sleeve member 22 and forming an enclosed space 37 with sleeve member 22. The second purchase member 33 is preferably made of metal and affixed to sleeve member 22 by welding or other means by which it is firmly attached and resistant to being dislodged. The second purchase member 33 also provides a convenient and secure structure to attach a bicycle with a lock, chain or cable.

As best seen in FIGS. 2 and 2A, the first end 34 of second purchase member 33 is affixed to sleeve member 22 at the location of sleeve aperture 30 which it surrounds.

Figure 2B:
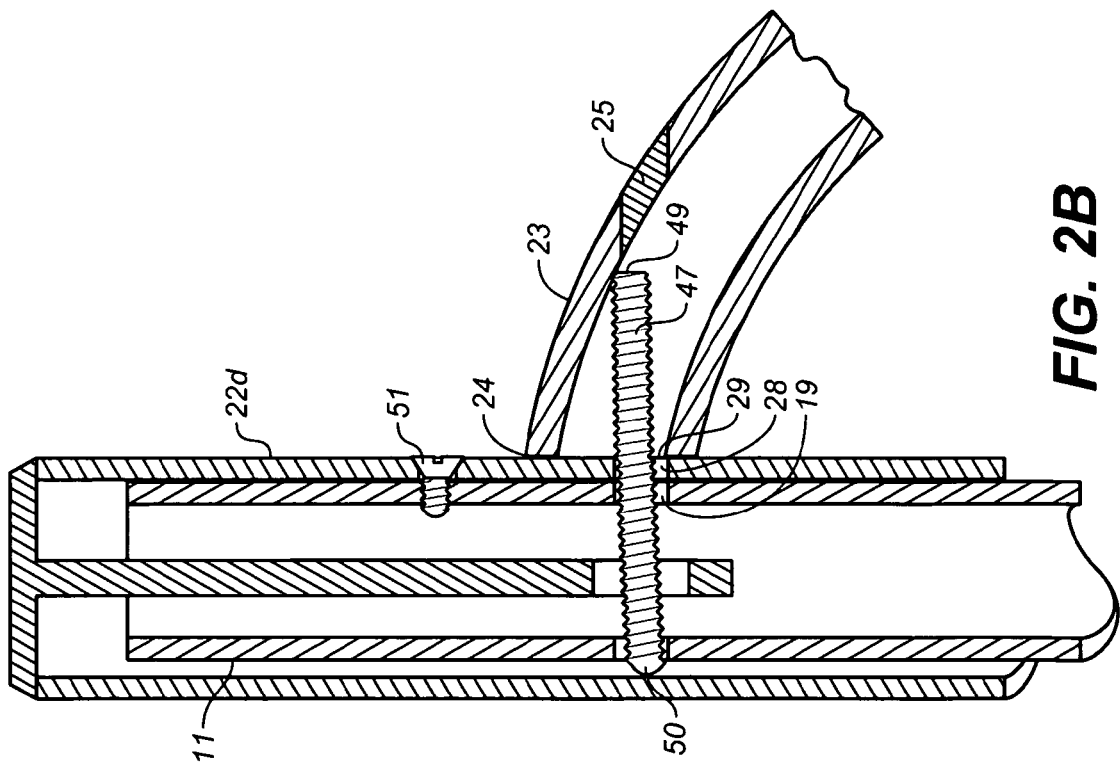
FIG. 2B is a partial sectional view similar to FIG. 2A of an alternative embodiment.

Referring also to FIG. 2B, in an alternative preferred embodiment, a tubular sleeve member 22d has a first tubular purchase member 23 and no second tubular purchase member and the sleeve through-bore 28 only pierces sleeve member 22 to form aperture 29. In all other respects, the tubular sleeve member 22d is the same as tubular sleeve member 22.

The first and second tubular purchase members 23 and 33 are illustrated as having a generally rectangular cross-section. A cross-section that is circular, elliptical or of another geometric shape could offer a structure to which a bicycle could be secured, as long as the member is sturdy, not easily dislodged from the sleeve member 22 and large enough to surround aperture 29.

Referring to FIGS. 2, 2A and 3, a cap member 41 comprises a disc-shaped top member 42, with no opening, dimensioned to engage and seat on sleeve member open upper end 22b, and a generally rectangular blade-like shaped cap lock member 43 affixed to the top member 42 and extending therefrom. The lock member 43 has a lock aperture 44. When top cover 42 engages and seats on sleeve member end 22b, the lock member 43 extends into the post 11, and lock aperture 44 aligns with the sleeve member through-bore 28, the post through-bore 19 and said purchase member access aperture 25. In one embodiment, the lock member aperture 44 is enlarged compared to the other through-bores to aid in alignment, as will be more fully appreciated by what follows.

In order to provide a very tight engagement between the top cover 42 and end 22b of sleeve member 22, cap lock member 43 is dimensioned to have an interference fit with the inside diameter 13a of post 11. In one embodiment, this interference fit is provided by protrusions 46 that extend the lock member width 43a at the locations of the protrusions 46 which increase the width of the cap lock member 43 to slightly greater than the inside diameter 13a of post 11. When lock member 43 is forced into post 11, an interference fit is created by protrusions 46 that wedges the lock member 43 and, per force, top cover 42 firmly in place against the end 22b of sleeve member 22 from which it is not easily pried loose.

As best seen in FIGS. 2 and 2A, a security rod 47, disposed entirely within the bicycle parking structure and in post through-bores 19, sleeve member through-bore 28 and cap lock aperture 44, locks the sleeve member 22, the post 11 and the cap member 41 together, preventing vertical movement of the sleeve member 22 and cap member 41 relative to anchored post 11. This effectively affixes the sleeve member 22 and cap member 41 to the post 11 and the ground 17. In an embodiment that includes a base cover member 18, the sleeve member 22, which is held against vertical movement, rests on the cover member 18 and prevents it from being moved upward to expose the base of the post. The locking mechanism that binds the sleeve member 22 to the post 11 is hidden from view entirely within the parking structure 21 from which it is inaccessible.

In one preferred embodiment, the security rod 47 is a length of threaded steel rod with a tapered end 48. The security rod is installed by insertion through access aperture 25 in the first tubular purchase member 23, through-bores 19 and 28 and aperture 44 until end 48 contacts the interior surface 33a of the second tubular purchase member 33. The rod 47 has enough flexibility that when the tapered end 48 is forcefully urged against surface 33a, it bends just enough to get wedged securely in place with its blunt end 49 inside the first purchase member 23 and above access aperture 25.

The access aperture 25 is preferably closed with an epoxy or other suitable closure means so that the internal mechanism that affixes the parking structure 21 to the post 11 is hidden from view and not accessible.

In the embodiment of FIG. 2B, the security rod 47 necessarily stops at the post 11 after being secured in post aperture 19a and bore 28 and aperture 44 and advantageously has a rounded leading end 50.

A security screw 51 binds post 11 and sleeve member 22 together to prevent any lateral movement between the two. The screw 51 passes through aperture 52 in sleeve member 22 and engages threaded aperture 53 in post 11, which draws the two together in tight engagement. Any attempt to free the sleeve member 22 from post 11 (and thereby any bicycle locked to the bicycle parking structure 21) by withdrawing screw 51 would prove futile.

Referring to FIGS. 2A and 2C, when security rod 47 is in place, the sleeve member 22 is not able to move vertically relative to post 11 and away from cover 18 to expose bolts 31. Not only does this prevent the bolts from being removed to dislodge the post 11, but also prevents exposure of post 11 where it could be cut.

Figure 4:
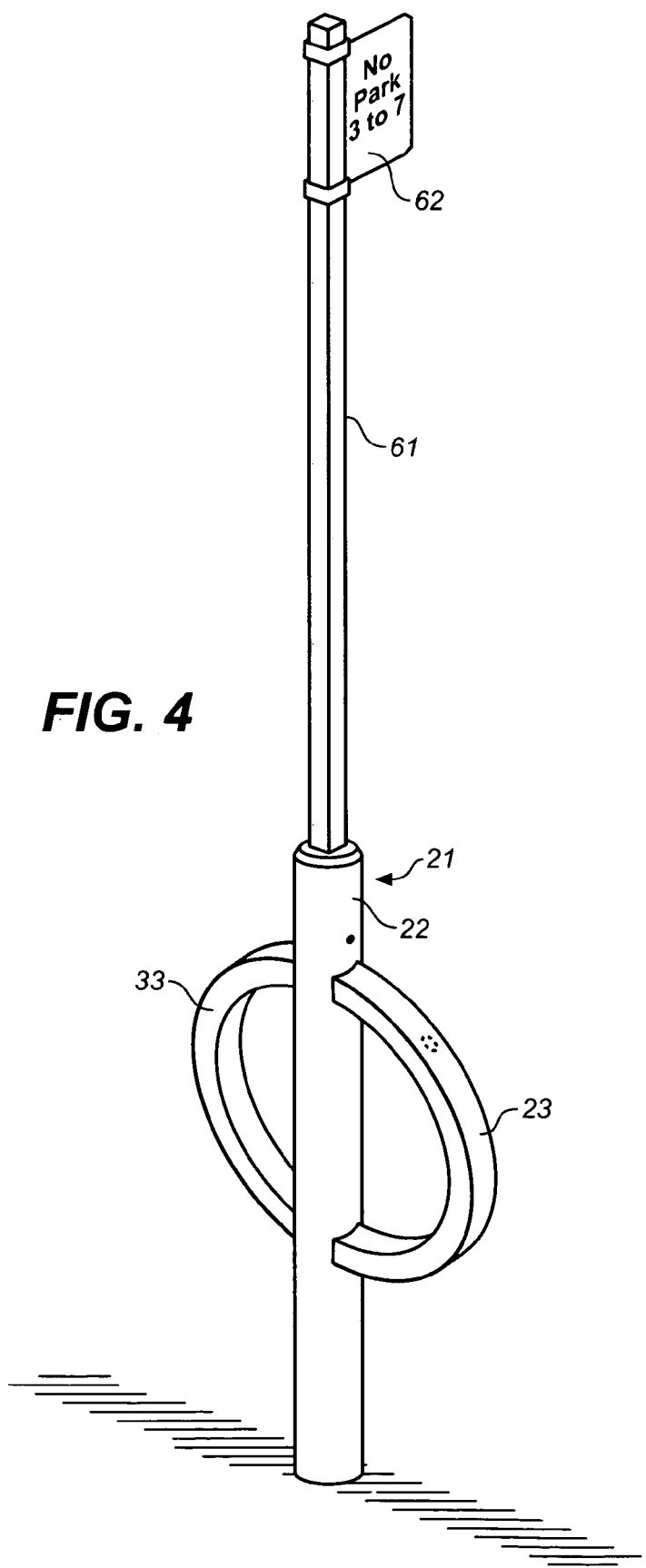
FIG. 4 is a perspective view of an alternative embodiment of the invention adapted to be used with a tall post.
Figure 6:
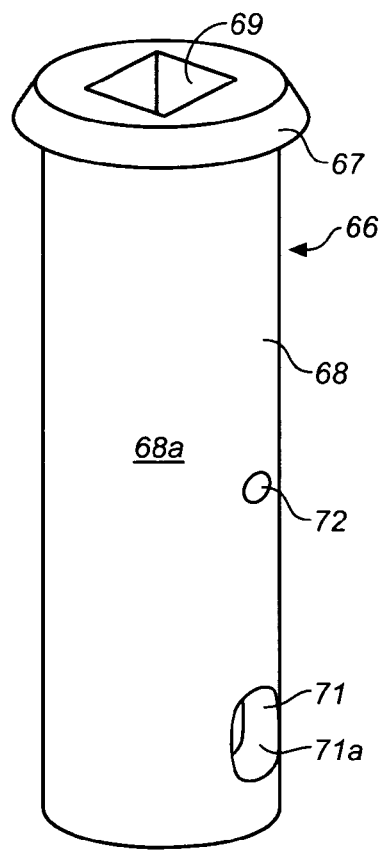
FIG. 6 is a perspective view of the cap member of the embodiment of FIG. 4.
Figure 5:
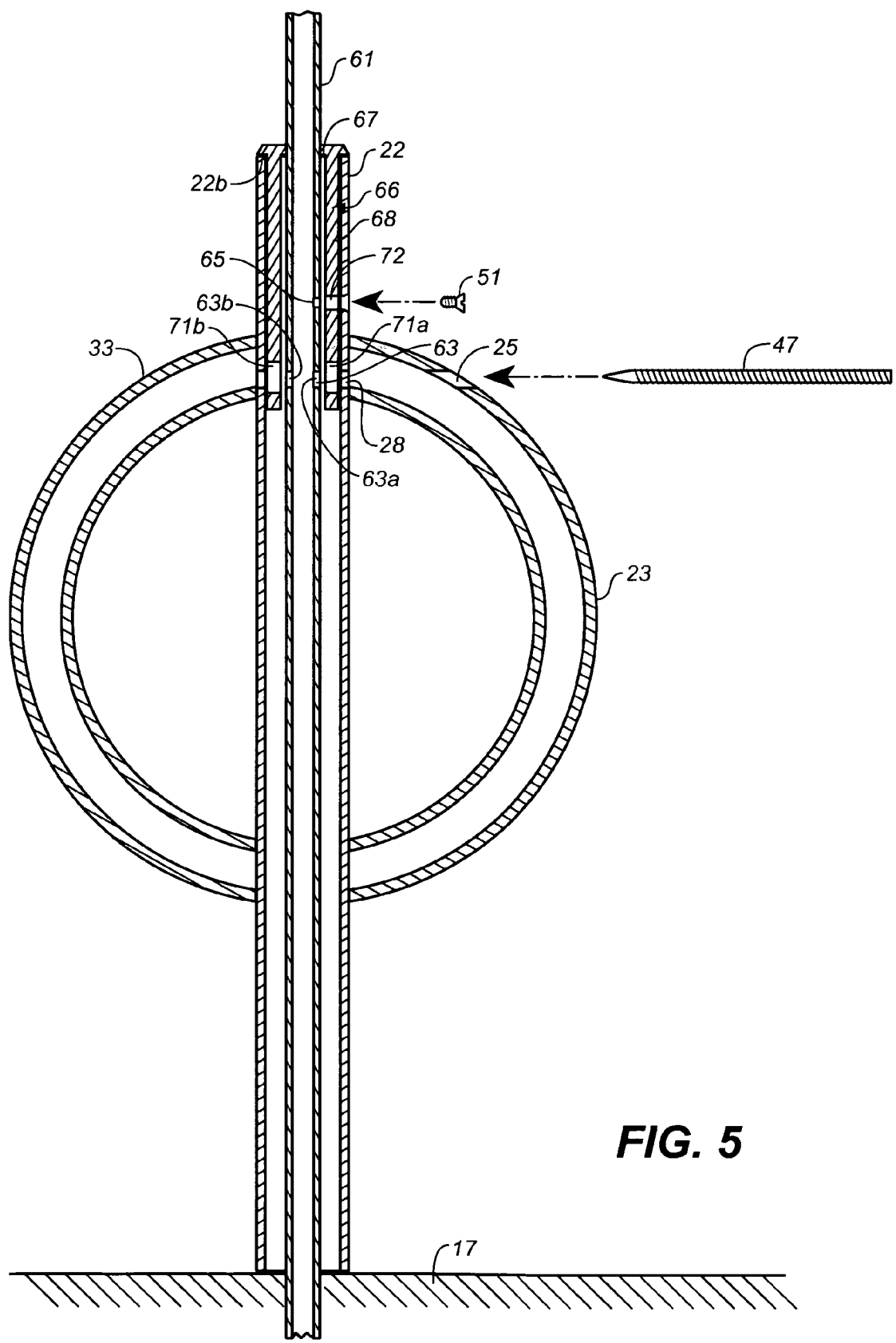
FIG. 5 is a partially exploded sectional view of the embodiment of FIG. 4.

Referring to FIGS. 4, 5 and 6, in another preferred embodiment, the bicycle parking structure 21 is disposed onto a post 61 that is anchored into the ground 17 at its lower end and extends above upper end 22b of sleeve member 22. Post 61 is illustrated as having a generally rectangular cross-section and supports a parking restriction sign 62, although the post 61 can be of other geometric cross-sections and support a sign or other object. Post 61 has a through-bore 63 with diametrically opposed apertures 63a and 63b. It also has a threaded bore 65 sized to match security screw 51.

A cap member 66 has a disc-shaped top cover 67 and a cap lock member 68 that is either integral with or affixed to and depends from cover 67. Top cover 67 has an opening 69 of a shape and sized to permit post 61 to pass through. Cap lock member 68 has a cylindrical outer surface 68a with an outside diameter sized to fit into tubular sleeve member 22 and form a tight fit therewith. The inside diameter of cap lock member 68 is sized and shaped to allow post 61, which it surrounds, to freely pass through.

Cap lock member 68 has a through-bore 71 with diametrically opposed apertures 71a and 71b that can be advantageously oval in shape to aid in alignment and allow the passage of security rod 47.

When the cap member 66 is secured in place with top cover 67 securely seated on the top 22b of sleeve member 22, apertures 61a and 61b in post 61 align with the apertures 71a and 71b in cap lock member 68 and through-bore 28 in sleeve member 22. As in the embodiment described previously, security rod 47 is disposed through access aperture 25 to be lodged in purchase members 23 and 33 and through-bores 71, 28 and 63 (similarly as illustrated in FIG. 2A).

In this embodiment, the security screw 51 is threaded into bore 65 in post 61, after passing through apertures in sleeve member 22 and cap lock member 66, to prevent lateral play between the various parts.

Of course, various changes, modifications and alterations in the teachings of the present invention may be contemplated by those skilled in the art without departing from the intended spirit and scope thereof. As such, it is intended that the present invention only be limited by the terms of the appended claims.

The invention claimed is:

1. A bicycle parking structure adapted to be mounted on and affixed to a generally vertical post wherein the post has a post vertical axis, a major diameter, a post through-bore generally transverse to the vertical axis, and an anchored lower end comprising:
   a tubular sleeve member concentrically disposed about the post having a sleeve transverse through-bore with at least one aperture that is aligned with the post transverse through-bore when said sleeve member is so disposed;
   a first tubular purchase member having two ends affixed to said sleeve member and defining with said sleeve member a first enclosed space wherein one of said affixed ends is located over and surrounds said at least one sleeve member aperture, further wherein said first tubular purchase member has an access aperture aligned with said sleeve through-bore and the post through-bore;
   a cap member having a top member dimensioned to engage said sleeve member and a lock member that has a lock aperture wherein said lock member extends along the post, and said lock aperture aligns with said sleeve member through-bore, the post through-bore and said purchase member access bore when said top member engages said sleeve member;
   a security rod disposed entirely within said bicycle parking structure, and in said first tubular purchase member, in the post through-bore, and in said at least one sleeve member aperture, and said cap lock member aperture.

2. The bicycle parking structure of claim 1 wherein said sleeve member through-bore has two transversely spaced apertures and further comprising:
   a second tubular purchase member having two ends affixed to said sleeve member and defining with said sleeve member a second enclosed space wherein one of said affixed ends is located over and surrounds the other of said sleeve member apertures;
   wherein said security rod is also disposed in said other sleeve member aperture and said second purchase member.

3. The bicycle parking structure of claim 2 wherein said security rod is a threaded steel rod having a tapered end in said second purchase member and a blunt end in said first purchase member wherein said blunt end is wedged in said first purchase member above said access aperture.

4. The bicycle parking structure of claim 1 wherein said security rod has a rounded end disposed in a post aperture and a blunt end wedged in said first purchase member above said access aperture.

5. The bicycle parking structure of claim 1 wherein the post has a lower end and further comprising:
   a base cover member surrounding the post lower end wherein said sleeve member rests on said base cover member and is held there by said security rod.

6. The bicycle parking structure of claim 5 wherein the anchored lower end of the post is disposed underground.

7. The bicycle parking structure of claim 5 wherein the anchored lower end of the post is secured by bolts which are disposed within said base cover member.

8. The bicycle parking structure of claim 1 wherein said cap member top member is disc-shaped with no opening and said cap lock member is disposed within the post and has a generally rectangular blade-like shape dimensioned to have an interference fit within the post.

9. The bicycle parking structure of claim 1 wherein said cap member top member has an opening sized to permit the post to pass through and said cap lock member has a generally cylindrical shape sized to fit within said sleeve member and around the outside of the post.

10. A bicycle parking structure adapted to be mounted on a vertical post wherein the post has a vertical axis, an anchored lower end, a major diameter and a through-bore generally transverse to the vertical axis comprising:
   a tubular sleeve member concentrically disposed about the post wherein when said sleeve member is so disposed about the post, said sleeve member extends above the post and wherein said sleeve member has a transverse through-bore with two apertures that are aligned with the post transverse through-bore when said sleeve member is so disposed;
   a tubular purchase member having two ends affixed to said sleeve member and defining a first enclosed space wherein one of said affixed ends surrounds one end of said sleeve member through-bore, further wherein said first tubular purchase member has an access aperture aligned with said sleeve member through-bore and the post through-bore;
   a security rod disposed by way of said access aperture in the through-bore of the post and the through-bore of said sleeve member and entirely within said parking structure where it is hidden from view.

11. A bicycle parking structure adapted to be mounted on a vertical post wherein the post has a lower end permanently secured in the ground and a length above ground and a generally transverse through-bore comprising:
   a tubular sleeve member concentrically disposed about the post along its entire length above ground wherein said sleeve member has a transverse through-bore that is aligned with the post transverse through-bore when said sleeve member is so disposed;
   a locking mechanism affixing said tubular sleeve member to the post wherein said locking mechanism engages the post through-bore and said sleeve member through-bore and is entirely within the parking structure where it is hidden from view and inaccessible from outside said parking structure.

* * * * *